(12) United States Patent
Kurkure et al.

(10) Patent No.: US 9,503,474 B2
(45) Date of Patent: Nov. 22, 2016

(54) IDENTIFICATION OF TRUSTED WEBSITES

(71) Applicant: VMWARE, INC., Palo Alto, CA (US)

(72) Inventors: Uday Kurkure, Palo Alto, CA (US);
Hari Sivaraman, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 17 days.

(21) Appl. No.: 14/624,599

(22) Filed: Feb. 18, 2015

(65) Prior Publication Data
US 2016/0241592 A1    Aug. 18, 2016

(51) Int. Cl.
*H04L 29/06*    (2006.01)

(52) U.S. Cl.
CPC ........... *H04L 63/1483* (2013.01); *H04L 63/08* (2013.01)

(58) Field of Classification Search
CPC .................................................. H04L 63/1483
USPC ............................................................. 726/5
See application file for complete search history.

(56) References Cited

U.S. PATENT DOCUMENTS

2006/0156016 A1\* 7/2006 Tanaka .................... G06F 21/36
   713/182
2009/0282345 A1\* 11/2009 Smith .................. G06Q 10/109
   715/744

\* cited by examiner

*Primary Examiner* — Longbit Chai
(74) *Attorney, Agent, or Firm* — James Kiryakoza

(57) ABSTRACT

This document describes techniques for identifying trusted websites. In one embodiment, a computer system can receive a request from user to access a website and a private image and a public image wherein the public image and the private image are associated with a user account that enables the user to access the website. The computer system then embeds the private image in the public image to create a combined image and transmits the combined image to a client device for processing. The computer system can then receive a confirmation from the user that at least the private image embedded in the combined image is verified.

18 Claims, 4 Drawing Sheets

IDENTIFICATION OF TRUSTED WEBSITES

BACKGROUND

Phishing is an attempt by a malicious actor to acquire sensitive information such as usernames, passwords, and credit card details, etc. by luring users to a fake website masquerading as a trusted website. Some websites help users identify trusted websites by requiring user to select a personal image. That personal image is displayed by a trusted website at each login attempt. Only after a user has identified the personal picture are they allowed to provide their credentials and login.

However, many users enter their credentials even if the personal image is absent or incorrect. Moreover, even if the image is correct, a malicious actor can fake the personal image by capturing a screenshot of the trusted web site while it is displaying the user's personal image. The captured image can then be displayed in the phishing website. Finally, most websites ask users to select their personal image from a small set of pre-selected images. A phishing website can display a random image from that set to users when they attempt to login. At least some combinations of image and user would be a match the user and image displayed by the trusted website.

DETAILED DESCRIPTION

Figure 1:
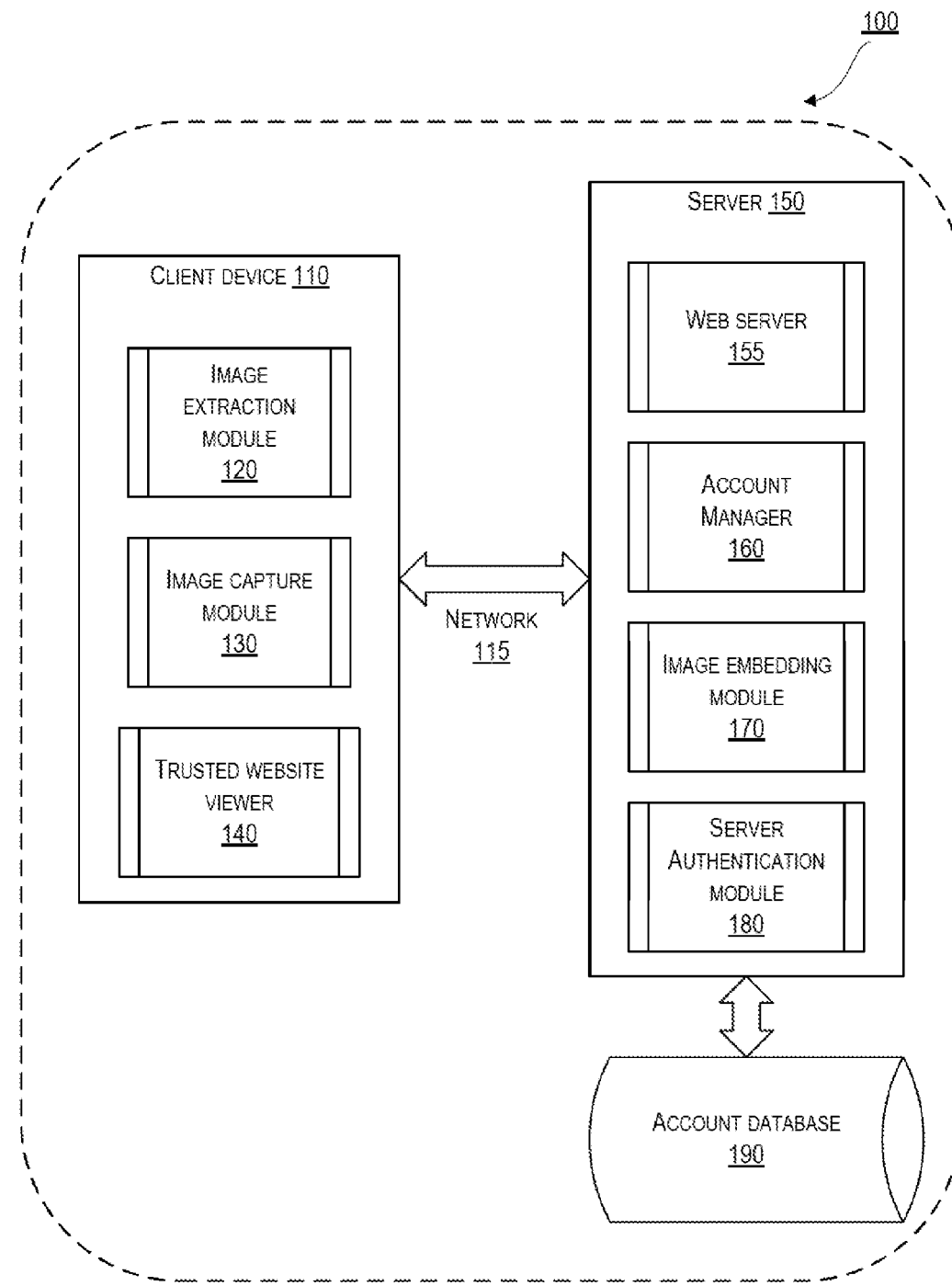
FIG. 1 depicts a system environment that supports the identification of trusted websites.

In the following description, numerous examples and details are included to provide an understanding of various embodiments. However, it will be evident to one skilled in the art that certain embodiments can be practiced without some of these details, or can be practiced with modifications or equivalents of the details.

1. Overview

This disclosure describes techniques that enable users to identify trusted websites. In one set of embodiments, the trusted website prompts a user to select a private and a public image. These images may be stored by the website and associated with the user's account.

When the user attempts to log into the trusted website, the trusted website prompts the user for a username. Upon receiving the username, the trusted website may then retrieve the private and public images previously selected by the user and embed the private image in the public image to create a combined image such private image is hidden in the combined image.

The trusted website then transmits the combined image to the user's client device for processing. The user's client device extracts the hidden private image from the combined image and presents it to the user. The user then inspects the extracted private image. If use determines that the private image seems visually identical to the private image previously provided to the trusted website, the user provides a confirmation to the trusted website that the private image is verified. By verifying the private image, the user implicitly identifies the website as trusted.

With the techniques described in the previous paragraphs users can identify trusted websites. These techniques advantageously defend against various methods malicious actors employ to fool users into trusting fake websites masquerading as a trusted websites. For example, forcing users to verify private images assures that the users have viewed the image instead of simply ignoring the image. In addition, hiding the private image in the fake image makes is more difficult for malicious actors to capture image for use in a fake website. Furthermore, allowing the user to select any public and private image increases the number of images that a malicious actor would need to capture in order to construct a fake website.

In some embodiments, the trusted website requires the user to provide a private image prior to each authentication attempt. This technique makes it easier for user to remember their private image. For example, if users were required to enter a private image just once (e.g. when the account was setup), it would be easy for them to forget what image they selected when they tried to authenticate to the trusted website months later. This technique also makes it more difficult for the malicious actor to capture and reuse the image on a fake website as the private image would unlikely be the same for each authentication attempt.

In some embodiments, trusted website embeds the private image in the public image by varying the embedding method selected from a set of embedding methods. For example, the private image can be embedded in the 4 least significant bits of each of Red, Green, and Blue (RGB) channels of public image with affecting the visual quality using one of the following techniques: 1) Hide the image using any of the our least significant bit of each of R, G and Channels; 2) Hide the image using one of the R, G, and B channels; 3) Hide the image using only Blue and Red Channel; 4) 4. Repeat the hidden image multiple times; or 5) Hide the image in select pixels of the public image. The server may select one of these methods based on a secret shared between the client and the trusted website such as a password by converting the passphrase to an integer by generating a hash from the password and then using the integer as an offset into a table of the aforementioned embedding methods. Varying the embedding method based on a shared secret, make it more difficult for a fake website to mimic the embedded picture even it somehow gained access to the private image.

These and other aspects of by present disclosure are described in further detail in the following sections.

2. System Environment

FIG. 1 depicts a system environment 100 that supports the identification of trusted websites according to one embodiment. System environment 100 includes a client device 110 and a server 150 connected via a network 115. In one embodiment, network 115 may be a wireless network or cell phone network. In other embodiments, network 115 can be a wired network such as a local area network (LAN), wide area network (WAN), or any combination of these or other types of networks.

Server 150 is used to run the components that enable a user to identify a trusted website. As such it comprises the software necessary to provide a website such as web server 155, an application server, database server and the like. (not shown) Web server 155 is used to server the pages of a trusted web site. Server 150 also comprises several modules including account manager 160, image embedding module 170 and server authentication module 180 that enable a user to identify the website as trusted. Server 150 may be any computer suitable for running software including, blade servers, desktop computers, notebook computers, cellphones, smartphones, tablet computers and the like. Server 150 may also be a virtual machine running on a hypervisor or an operating system level virtualization container running on a host operating system.

Account manager 160 enables a user to create and maintain a user account that enables the user to access the website implemented by server 150. As part of account creation and maintenance (or at any other point after account creation) user may provide account manager 160 with, among other things, a means to identify the user account (e.g. a user name), authentication credentials (e.g. a password) and public and private images to display on the trusted website. Account manager 160 requests and receives this account information from the user may store it in account database 190. Account manager 160 may store the public and private images in separate fields may user image embedding module 170 to embed private image in public image into a combined image and simply store the combined imaged. Account database 190 may be a SQL database, key-value store or any other database suitable fix storing and retrieving information.

Server authentication module 180 enables a user to authenticate to the trusted website. When a user visits the login page of a website using trusted website viewer 140, server authentication module 180 challenges the user provide a user account name or some other means of identifying the user's trusted website account. Upon receiving a user account name, server authentication module 180 uses account manager 160 to retrieve the user account identified by the user account name. The user account may include the public and private images provided by the user or the combined image. Server authentication module 180 then uses image embedding module 170 to embed private image in public image to form a combined image.

In some embodiments, the user account may not store the private image or the combined image. In this embodiment the user is required to provide a private image for each authentication attempt using image capture module 130. For example, image capture module 130 may capture a private image by causing client device to take a photograph. In another example, image capture module may randomly select or prompt the user select an image already stored on client device 110 or from any interact location accessible by client device 110. When server 150 receives the private image, server authentication module 180 uses image embedding module 170 to embed private image in public image to form a combined image. As discussed in previous paragraphs, image embedding module 170 may one of a variety of methods to embed the private image in the public image based on some share secret between client device 110 and server 150.

After forming the combined image, server authentication module 180 then provides the combined image to trusted website viewer 140 running on client device 110. Client device 110 comprises several modules including image extraction module 120, image capture module 130 and trusted website viewer 140 that enable a user to interact with server 150 to identify a trusted web site. Client device 110 may be any computer suitable for running software including cellphones, smartphones, tablet computers, notebook computers, desktop computers and the like. Trusted website viewer 140 may be a web browser, web browser plugin, mobile application or any software application suitable to displaying web pages. Upon receiving the combined image, trusted website viewer 140 may use image extract module 120 to extract the private image from the public image. After extract the private image from the public image, trusted website view may then display the private image and, optionally, the public image to the user.

A user then verifies the private image and provides the verification to server authentication module 180 using trusted website viewer. By verifying the image, the user has identified the website as trusted. Only after server authentication module 180 has received this verification will it challenge the user for a password.

System environment 100 of FIG. 1 is illustrative and not intended to limit the embodiments described in this document. For example, although web server 155 and account manage 160 are shown as running on the same server, in other embodiments the functions of these two components may be separated into a multiple servers. Further, the various entities of system environment 100 may be arranged according to other configurations and/or may include subcomponents or functions that have not been specifically described. One of ordinary skill in the art will recognize many variations, modifications, and alternatives.

3. Account Image Management

Figure 2:
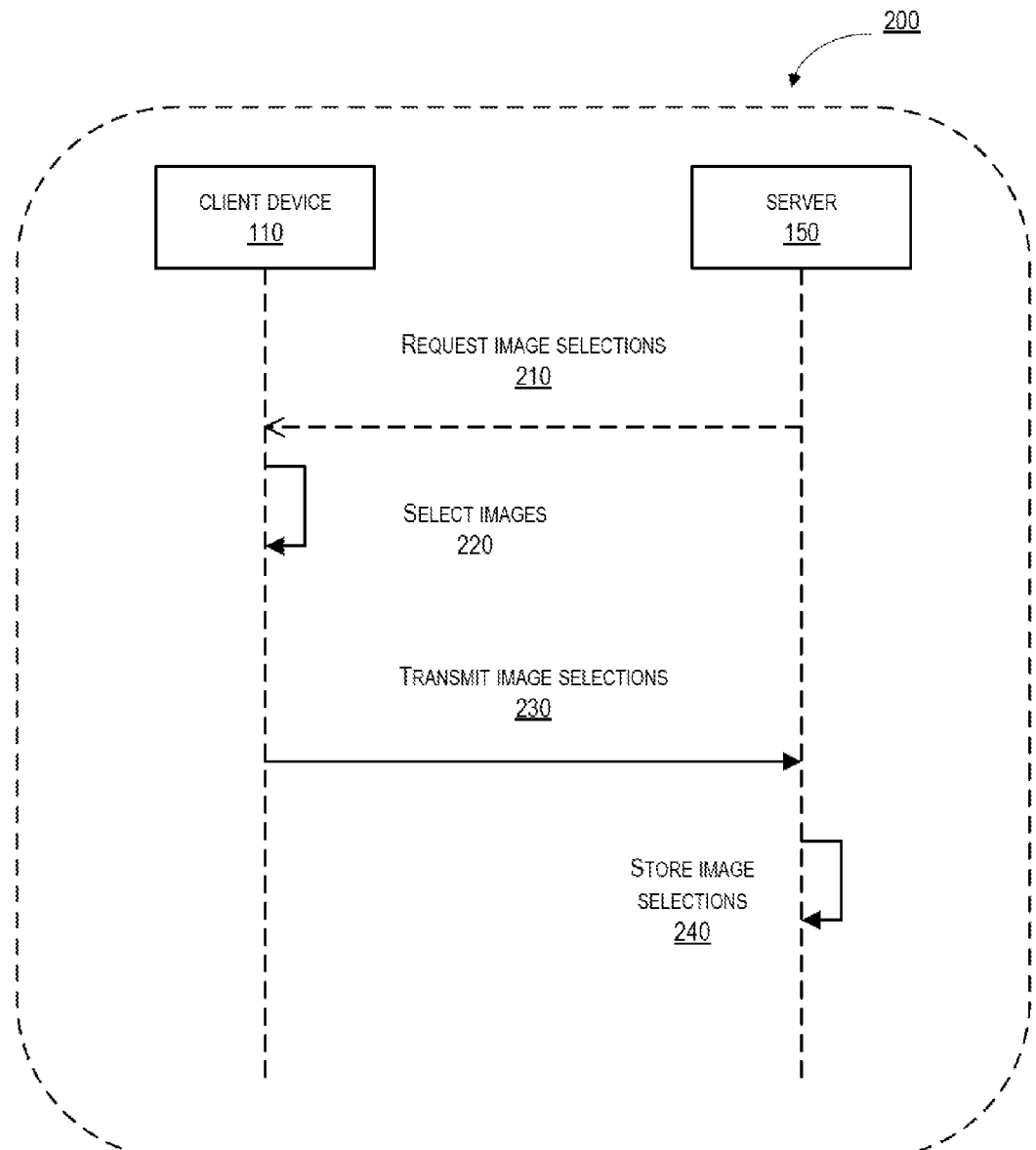
FIG. 2 depicts a sequence diagram for configuring a user account for identifying trusted websites.

FIG. 2 depicts a workflow 200 that may be executed in the context of system environment 100 of FIG. 1 to configure a user account for identifying a trusted website according to an embodiment. Workflow 200 assumes that a user has requested to create a new user account or modify an existing user account.

At step 210 the server requests that the user provide image selections. The request may be initiated by account manager 160. The request may include sets of pre-determined public and private images. At step 220, the user selects at least one image. The images may be selected from the pre-determined sets provided by server 150 or selected by using image capture module 130. At step 230, the user transmits the one or more image selections to the server. At step 240, the server stores the image selections along with other use account information in account database 190. In some embodiments, the public and private images are stored separately. In other embodiments, the private image is embedded in the public image by image embedding module 180 to form a combined image and the combined image is stored with the user account.

In some embodiments at step 210 the server 150 may only request that the user provide a public image. In this embodiment, the request may only contain a set of pre-determined public images. The user may select from this set or select an image using image capture module 130. In this embodiment, client device 100 only transmits the public image selection to server 150 at step 230 and server 150 only stores the public image at step 240. As previously discussed, when the server only stores a public image for the user, the user must provide a private image for each authentication attempt.

4. Trusted Website Identification Workflow

Figure 3:
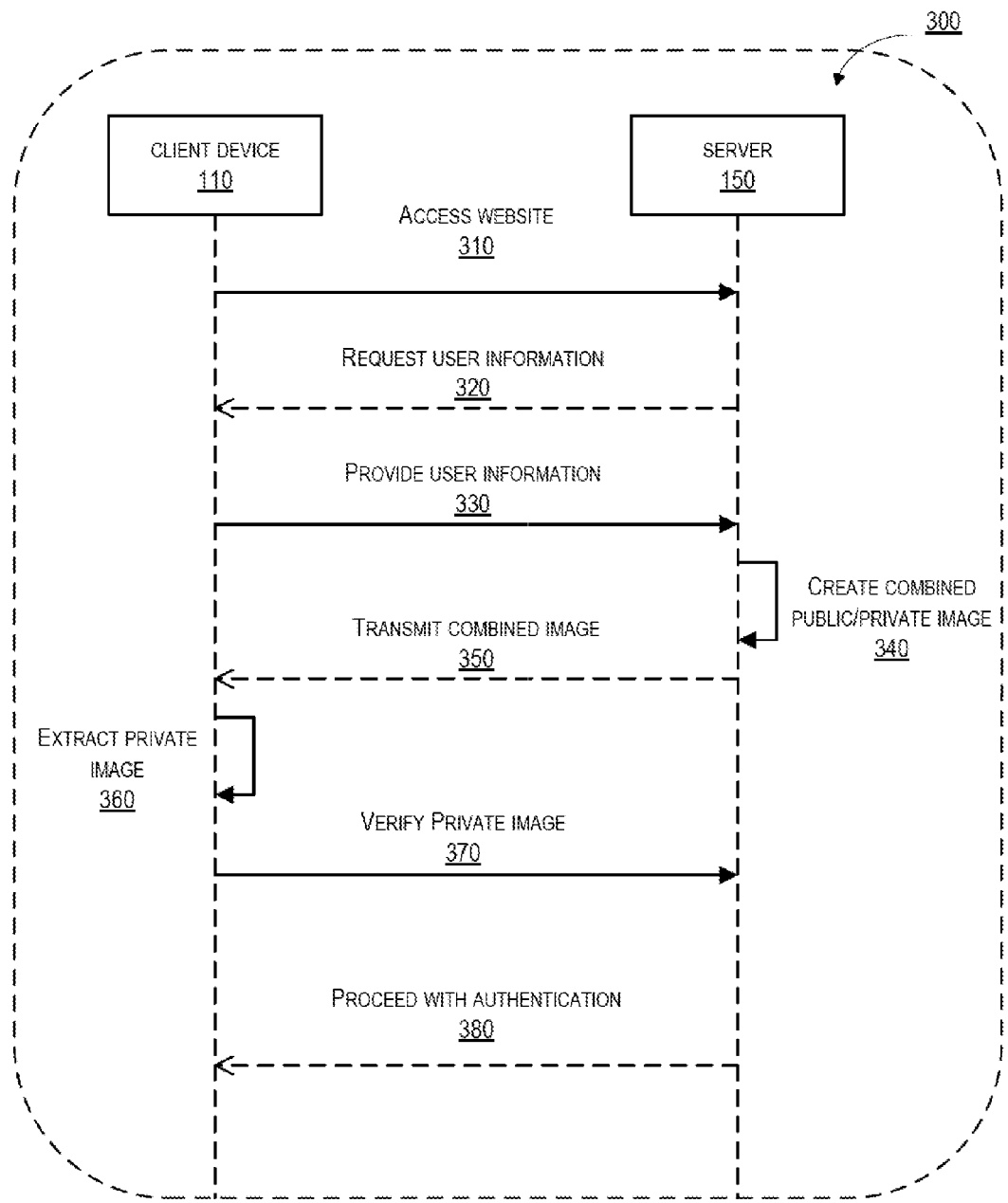
FIG. 3 depicts a sequence diagram for identifying trusted websites.

FIG. 3 depicts a workflow 300 that may be executed in the context of system environment 100 of FIG. 1 to identify a trusted website according to an embodiment. The workflow begins at step 310 when the user attempts to access website served by server 150 from client device 110 using trusted website view 140.

At step 320, server authentication module 180 responds to this attempt by challenging the user to provide a user id or some other information that the server authentication module 180 may use to retrieve user's website account. At step 330, user provides user id to server authentication module 180.

In some embodiments, the user's private image is not stored by server 150, so, at step 320, server authentication module 180 also requests user's private image. In this embodiment, user selects a private using image capture module 130. As described earlier, user can user image capture module to select a private image in several ways including, but not limited to, taking a picture using client device, selecting an image stored on client device or selecting an image from the internet. Image capture mat also be configured to randomly select an image and display it to the user for the user's verification. In this embodiment, at step 330, use provides server 150 with the selected private image in addition to information used to identify the user's website account.

At step 340, server 150 uses image embedding module 170 to embed user's private image in user's public image. In one embodiment image embedding module 170 uses the same image embedding algorithm each time it embeds an image.

In other embodiments, image embedding module 170 selects the image embedding methods from an array of multiple image embedding method based on a secret that is shared between the user and server. For example, the user and server 150 share the user's secret password. The image embedding module 170 may hash the user's password to convert it to a number and then transform the hashed password into an index into the array of embedding methods. Image embedding module 170 may use this index to select the image embedding method from the array of embedding methods and then use the selected image embedding method to embed the user's private image in the user's public image to generate a combined image.

Figure 4:
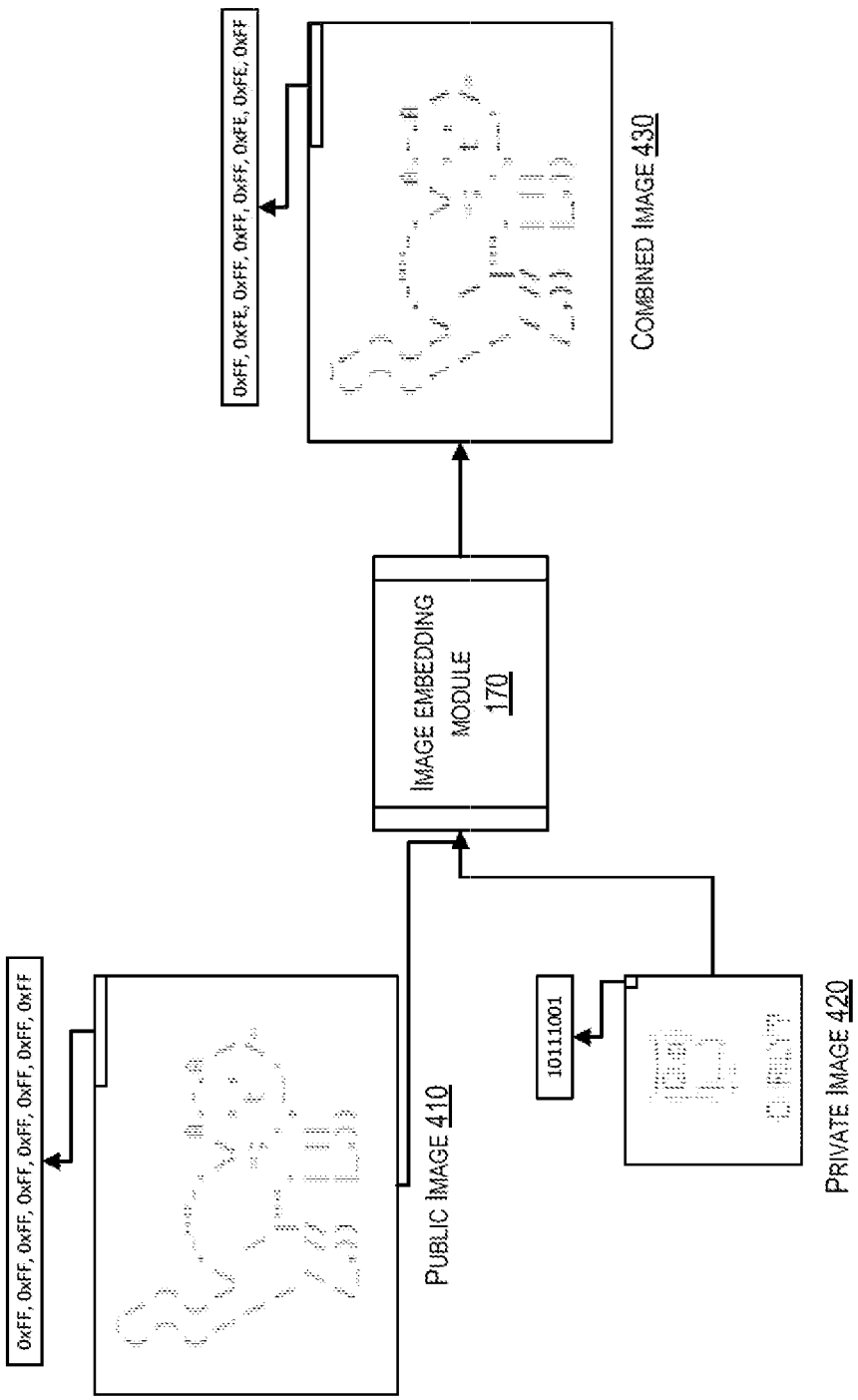
FIG. 4 depicts the process of using a public image and private image to generate a combined image.

The embedding process is depicted in FIG. 4. Public image 410 includes pixels 0xFF, 0xFF, 0xFF, 0xFF, 0xFF, 0xFF, 0xFF, 0xFF. Note that the pixels are assumed to be 8-bit in this embodiment. Private image 420 includes pixel with binary value 10111001. In one embodiment when image embedding module 170 decides to embed private image 420 into public image 410 to create combined image 430 by using the least significant bit of in the pixels of the public image, it generates a sequence of pixels 0xFF, 0xFE, 0xFF, 0xFF, 0xFF, 0xFE, 0xFE, 0xFF that will be included in combined image 430 based on the pixels from public image 410 and the pixel from private image 420. Image embedding module 170 generates the combined pixels using the least significant bit of the pixels from the public image. Therefore, the combined image appears visually unchanged to ordinary inspection such as the human eye. Since the each bit of the private image is embedded in the least significant bit of each pixel of the composite image, the private image is $\frac{1}{8}^{th}$ the size of the public and composite images in width and length.

In yet another embodiment, server 150 stores the combined image with the user's website account. In this embodiment, step 340 is performed when the user's account was creates or modified to include public and provide images.

At step 350, server 150 transmits the combined image for verification by the user. At step 360 image extraction module 140 extracts the private image from the combined image and displays private image using trusted website viewer 140.

In one embodiment, image extraction module 140 uses the same image extraction algorithm to extract the private image. In other embodiments, image extraction module 140 selects the image extraction method from an array of multiple image extraction methods based on a secret that is shared between the user and server. For example, the user and server 150 share the user's secret password. The image extraction module 140 may hash the user's password to convert it to a number and then transform the hashed password into an index into the array of extraction methods. Image extraction module 140 may use this index to select the image extraction method from the array of extraction methods and then use the selected image extraction method to extract the user's private image from the combined image.

At step 370 user verifies that the extract provide image is the private image provided by the user to server 150. For example, the user may verify the picture by determining that the private image seems visually identical to the private image previously provided to the trusted website. By verifying the private image, the user is implicitly identifying the website server by server 180 as trusted. At step 380, if server authentication module 180 receives a response from the user that the user has verified the private image, server authentication module can then proceed with any further steps required to authenticate the server such as challenging user for credentials such as passwords, certificates, etc.

The sequence diagrams of FIGS. 2 and 3 are illustrative and various modifications are possible. For example, although specific sequences of steps are shown, other sequences of steps may be performed in other embodiments. Further, steps described as sequential can be executed in parallel, order of steps can be varied, and steps may be modified, combined, added, or omitted. One of ordinary skill in the art will recognize many variations, modifications, and alternatives.

Certain embodiments described in this document can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices microprocessor systems microprocessor-based or programmable consumer electronics, minicomputers, mainframe computers, and the like.

Yet further one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or a embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the detailed description and throughout the claims that follow, "a," "an," and "the" includes plural references unless the context clearly dictates otherwise. Also, as used in the detailed description and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for identifying trusted websites, the method comprising:
    receiving a request from a client device to access a website using a user account that enables to access the website;
    retrieving a private image and a public image wherein the public image and the private image are associated with the user account;
    embedding the private image in the public image to create a combined image;
    transmitting the combined image to the client device for processing;
    receiving a confirmation from the client device that at least the private image is embedded in and extracted from the combined image; and
    in response to receiving the confirmation, allowing access to the website based on validating the credentials of the user account.

2. The method of claim 1 wherein the private image is derived from an image captured by the client device.

3. The method of claim 2 wherein the image captured by the client device is captured using the client device's camera.

4. The method of claim 2 wherein the image captured by the client device is captured by selecting an image from the internet.

5. The method of claim 2 wherein the private image is embedded in the public image using an embedding method derived from a secret that is shared by the server and the user.

6. The method of claim 1 further comprising:
    Upon receiving a confirmation from the user that at least the private image embedded in the combined image is verified, challenging the user for authentication credentials.

7. A non-transitory computer readable storage medium having stored thereon software executable by a computer system, the software embodying a method for identifying trusted websites, the method comprising:
    receiving a request from a client device to access a website using a user account that enables to access the website;
    retrieving a private image and a public image wherein the public image and the private image are associated with the user account;
    embedding the private image in the public image to create a combined image;
    transmitting the combined image to the client device for processing;
    receiving a confirmation from the client device that at least the private image is embedded in and extracted from the combined image; and
    in response to receiving the confirmation, allowing access to the website based on validating the credentials of the user account.

8. The non-transitory computer readable storage medium of claim 7 wherein the private image is derived from an image captured by the client device.

9. The non-transitory computer readable storage medium of claim 8 wherein the image captured by the client device is captured using the client device's camera.

10. The non-transitory computer readable storage medium of claim 8 wherein the image captured by the client device is captured by selecting an image from the internet.

11. The non-transitory computer readable storage medium of claim 8 wherein the private image is embedded in the public image using an embedding method derived from a secret that is shared by the server and the user.

12. The non-transitory computer readable storage medium of claim 7 further comprising:
    Upon receiving a confirmation from the user that at least the private image embedded in the combined image is verified, challenging the user for authentication credentials.

13. A computer system comprising:
    a plurality of processors; and a non-transitory data store having stored thereon program code which, when executed by one or more of the plurality of processors, causes the one or more processors to:

receive a request from a client device to access a website using a user account that enables to access the website;

retrieve a private image and a public image wherein the public image and the private image are associated with the user account;

embed the private image in the public image to create a combined image;

transmit the combined image to the client device for processing;

receive a confirmation from the client device that at least the private image is embedded in and extracted from the combined image; and in response to receiving the confirmation, allowing access to the website based on validating the credentials of the user account.

14. The system of claim 13 wherein the private image is derived from an image captured by the client device.

15. The system of claim 14 wherein the image captured by the client device is captured using the client device's camera.

16. The system of claim 14 wherein the image captured by the client device is captured by selecting an image from the internet.

17. The system of claim 14 wherein the private image is embedded in the public image using an embedding method derived from a secret that is shared by the server and the user.

18. The system of claim 13 wherein the program code further causes a processor to:

Challenge the user for authentication credentials upon receiving a confirmation from the user that at least the private image embedded in the combined image is verified.

* * * * *